Patented Feb. 24, 1931

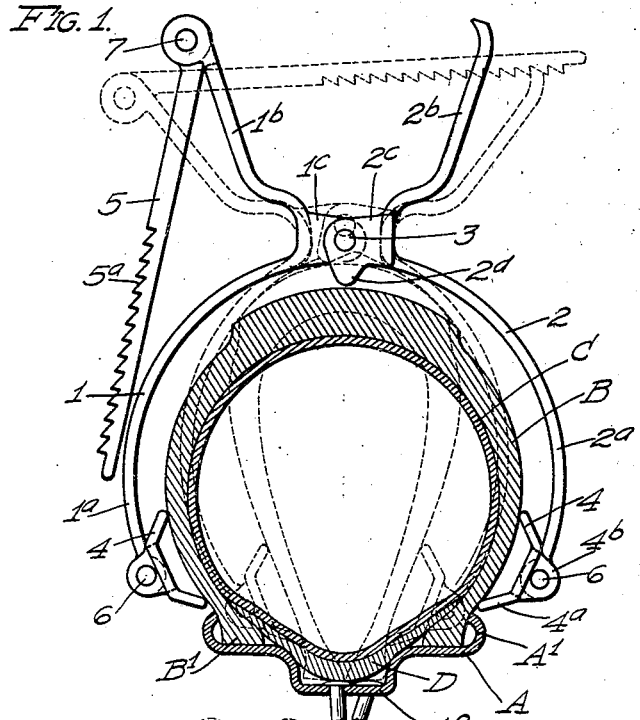

1,793,607

UNITED STATES PATENT OFFICE

JAMES A. GOODMAN, OF SOUTH GATE, CALIFORNIA

PNEUMATIC-TIRE TOOL

Application filed May 11, 1928. Serial No. 276,977.

My invention relates to a tire tool to facilitate the mounting and dismounting of tires on and from tire rims.

The objects of my invention are: first, to provide a tire tool of this class which is particularly adapted for mounting and dismounting tires on and from unitary tire rims, that is, tire rims which are not split or separable, and such tire rims having circumferential channels at the middle portions of their tire receiving sides, such as tire rims in use on automobiles known as Ford automobiles; second, to provide a tool of this class whereby the opposite sides of pneumatic tires may be contracted relative to each other so that their bead portions may be easily forced together to facilitate the entry of the portions of the beads forced together into the circumferential channel of the tire rim so that the diametrically opposite side of the tire may be easily and quickly shifted to one side beyond the tire rim for removing the tire therefrom and for similarly mounting the tire thereon; third, to provide a tool of this class which will engage considerable portions of the opposite sides of the tire and contract the same over a considerable circumferential extent; fourth, to provide a tool of this class in which the manual gripping portions are so arranged as to provide considerable gripping space for the fingers of the hand of the operator for efficient operation and for reduction of liability to injury to a minimum; fifth, to provide a tool of this class whereby the overall length of the tool outwardly from the peripheral portion of the tire is reduced to a minimum when the tire is contracted so that the outer portion of the tool beyond the peripheral portion of the time may pass readily between the tire and the fender of the automobile; and, sixth, to provide as a whole, a novelly constructed tool of this class and one which is particularly simple and economical of construction, durable and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claim, reference being had to the accompanying drawings and to the characters of reference thereon which form a part of this application in which:

Figure 1 is a cross sectional view of a tire rim and a tire mounted thereon and my tire tool extended around the same in position to contract the tire, and showing by dotted lines the tire in its contracted position and the tool in its contracting position; Fig. 2 is a side view of my tool separate and apart from the tire and the tire rim; Fig. 3 is a side view of my tire tool in a slightly modified form of construction; and, Fig. 4 is a side elevational view of my tool in still another slightly modified form of construction, and also showing fragmentarily by dotted lines the tool in its contracting position.

Like characters of reference refer to similar parts and portions throughout the several views of the drawings.

The tire rim, designated A, in this instance forms also the rim or felly of the wheel. This rim is provided at its opposite edges with annular flanges $A^1$ for retaining the tire, designated B, thereon. Intermediate the edges of the rim, or at the middle portion thereof, is provided an annular channel $A^2$ extending inwardly toward the center of the wheel, the width of the channel being approximately twice the thickness of the bead $B^1$ of the tire, and the depth of the channel being approximately the height of the flanges $A^1$ beyond their main tire seating surface of the rim.

The tire B may be of the conventional construction of tires usually used on demountable rims. The inner tube, designated C, is also of conventional construction and is separated in the usual manner from the tire rim by the flap D, which in this instance is slightly heavier than the conventional flap and extends partially into the channel $A^2$.

When demounting a tire of this kind from the tire rim, the opposite sides are contracted to approximately the position shown by dotted lines of the tire in Fig. 1 until the bead portions $B^1$ are forced together, the inner tube C and the flap D being forced inwardly into the tire or casing B. The beads thus forced together are dropped or forced into the channel A², permitting the diametrically opposite side of the tire to be extended radially beyond the flanges A¹ and to be forced to the side beyond and free of the rim. The portion of the tire, contracted as stated, and as shown by dotted lines in Fig. 1, is then lifted from the channel A² and from the rim. The mounting of the tire on the rim is effected in a similar manner but in reverse order.

My tire tool for contracting the tire, as stated, consists in one embodiment as shown in Figs. 1 and 2, of a pair of tong or tire contracting members 1 and 2 which are pivotally connected intermediate their ends by a rivet 3, seat or tire engaging members 4, and a catch or holding member 5.

The tong members 1 and 2 are for the most part symmetrical in construction, the same being provided at one side of their pivotal connection with outwardly bulged portions 1a and 2a respectively, and at the opposite side of their pivotal connection with arms forming manual grip portions 1b and 2b respectively. The portions intermediate the outwardly bulged and manual grip portions of each of the members 1 and 2 are offset inwardly or toward each other and are provided at such intermediate portions with spaced lugs 1c and 2c respectively which overlap each other and are pivotally connected by the pin or rivet 3. The curvature of the bulged portions 1a and 2a is such that when said portions are separated, as shown by solid lines in Fig. 1, sufficient clear space is provided for receiving a portion of the tire B, the portions or arms 1a and 2a extending to the opposite sides of the tire.

At the ends of the portions or arms 1a and 2a are provided wide tire engaging portions which are preferably in the form of tire engaging or seat members 4 pivotally connected to said ends of said members 1 and 2 by pins 6 which extend through eyes at said ends of the members 1 and 2. The members 4 are preferably made of sheet metal in the form of channels with their flanges 4a directed inwardly in diverging form and adapted to engage at their edges in the outer sides of the tire. These members 4 are also preferably arcuate, as shown in Fig. 2, so as to conform substantially with the curvature circumferentially of the outer sides of the tire. These tire engaging members 4 are of considerable length for engaging and contracting as large a portion of the tire as practicable, and are pivotally connected at their outer sides and intermediate their ends to the members 1 and 2, as stated. The pivotal connection is preferably effected by forming lugs at the outer sides of the members 4 by punching portions of the members 4 outwardly, as indicated by 4b. The pivotal connection of the members 1 and 2 to the tire engaging members 4 is preferably as close to the back sides of the members 4 as possible so that the lugs 4b will not interfere with the flanges A¹ when contracting the tire or when again releasing the same, the clearance being shown by the relation of the dotted line positions of the members 4 and the flanges A¹. The flanges 4a of the members 4 are preferably at an angle, or beveled, particularly the more remote or outer flanges 4a, so that when the contracting force against the tire is released, when the tire is already placed on the rim, the members 4 will be automatically forced radially outwardly from the rim if they should engage the flanges A¹, thus preventing the members 4 from being clamped between the flanges A¹ and the tire B.

The manual grip portions or arms 1b and 2b are offset outwardly so as to provide ample space between said arms for the fingers of the operator when separating said arms and contracting the portions 1a and 2a, and also for the purpose of bringing the extended ends of said arms as far apart as practicable so that when the same are separated to the positions, as shown by dotted lines, or beyond such positions, the distance of the ends of the arms outwardly from the pivotal connection of the members 1 and 2, or the distance outwardly from the peripheral portion of the tire, will be as small as possible so that the portion of the tool extending beyond the peripheral portion of the tire may be readily shifted between the tire and the fender of the automobile.

At the free end of the arm 1b is pivotally mounted, by means of a pin 7, a serrated catch or holding arm 5 which may be considerably narrower than the members 1 and 2, as shown by dotted lines in Fig. 2, and mounted in a slot between the opposite edges of the member 1. One side of the member 5 is provided with teeth 5a which are preferably beveled, adapted to engage the free end of the arm 2b, when the arms 1a and 2a are contracted for holding the tire in a contracted position, the member 5 falling loosely against the arm 2b. The end of the arm 2b is turned inwardly slightly so as to prevent the fingers from slipping off. The end is also slightly beveled so as to permit the same to engage the seat 5a readily.

In order to limit the placing of the tool over and around a tire, particularly when the tire is to be mounted on a rim, so that the tire engaging members 4 are not positioned too closely to the beads B¹ of the tire, thus preventing interfering of the members 4 in any way with the tire rim, there may be provided lugs 2d on the lugs 2c, as shown. These lugs 2d are preferably made relatively narrow so that the same may be readily shifted out of the way of the tire when the arms 1a and 2a are contracted when the tire is collapsed, thus increasing the depth between the arms 1a and 2a inwardly from their outer ends when the tire is contracted, as shown by dotted lines in Fig. 1.

The modified form of construction of my tool shown in Fig. 3 is similar to that shown in Figs. 1 and 2, but in this case the teeth are provided at the inner side of the arm 2b, as indicated by 2c. The catch or holding member 5 in this instance is considerably shorter and positioned between the arms 1b and 2b and serves as a pawl for engaging at its free end the teeth 2e. In this construction the arm 1b is offset laterally providing a grip portion between the arm and the pawl in such relation to the pawl that as the arms 1b and 2b are separated, the pawl 5 may be forced into engagement with the teeth 2e by the fingers of the hand gripping the arm 1b, or the pawl may be forced into engagement with the teeth by any other suitable means. In this construction also the portion on the arm 2b adapted to be engaged or gripped by the hand is preferably extended beyond the outer end of the arm 1b in such a manner that the arm 2b may be pushed while the arm 1b may be pulled, thus separating the two. In this modification, the tire engaging portions or members 4 cannot be released as easily as in the construction first described, but the two arms 1b and 2b must first be forced apart manually.

The tool shown in Fig. 4 may be of larger construction and adapted primarily for use in tire shops or service stations with the members 1 and 2 stronger and the arms 1b and 2b longer. In this modification, the tool is operated as a pair of pliers in which the members 4 are contracted relative to each other as the handles or arms 1b and 2b are forced together. The tool in this latter modification is made of strap iron, as in the other constructions described, but the pivotal portions of the members 1 and 2 in this instance are formed by twisting a portion of the members 1 and 2 intermediate their ends so that the wider flat sides are movably positioned against each other and pivotally connected by a rivet 3 extending transversely therethrough. These twisted portions may also extend the greater portion of the extent of the outwardly bulged arms 1a and 2a so as to provide a stronger construction.

At the free end of the arm 2b is pivotally mounted a link 8 which, when the two arms 1b and 2b are forced together, as shown by dotted lines, the link may be rotated around the free end of the arm 1b into engagement with a notched or hook portion 1d at said end, as shown.

Though I have shown and described a particular construction, combination and arrangement of parts and portions, and certain modifications thereof, I do not wish to be limited to this particular construction, combination and arrangement, nor to the modifications, but desire to include in the scope of my invention the construction, combination and arrangement of parts and portions substantially as set forth in the appended claim.

Having thus described my invention, what I claim as new and desire to secure by Letters Patent is:

In a pneumatic tire tool of the class described, a pair of pivotally connected tong members, and long, wide, deep tire engaging members pivotally connected to the ends of said tong members in opposed relation to each other, the lower outer sides of said tire engaging members being beveled to facilitate the expansion of the tire to the flanges of the tire rim.

In testimony whereof, I have hereunto set my hand at Los Angeles, California this 23rd day of April 1928.

JAMES A. GOODMAN.